United States Patent
Gharmalkar et al.

(10) Patent No.: US 10,445,381 B1
(45) Date of Patent: Oct. 15, 2019

(54) SYSTEMS AND METHODS FOR CATEGORIZING ELECTRONIC MESSAGES FOR COMPLIANCE REVIEWS

(71) Applicant: Veritas Technologies LLC, Santa Clara, CA (US)

(72) Inventors: Ramesh Gharmalkar, Pune (IN); Nitin Chaudhari, Pune (IN); Ujwala Patil, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 600 days.

(21) Appl. No.: 14/737,521

(22) Filed: Jun. 12, 2015

(51) Int. Cl.
*G06F 15/16* (2006.01)
*G06F 16/9535* (2019.01)
*H04L 12/58* (2006.01)
*G06F 16/2457* (2019.01)

(52) U.S. Cl.
CPC .... *G06F 16/9535* (2019.01); *G06F 16/24578* (2019.01); *H04L 51/18* (2013.01)

(58) Field of Classification Search
CPC ............... G06F 17/3061; G06F 17/30705
See application file for complete search history.

(56) References Cited

U.S. PATENT DOCUMENTS

| | | | | |
|---|---|---|---|---|
| 7,716,217 B2 * | 5/2010 | Marston | .............. | G06Q 10/107 707/728 |
| 8,311,960 B1 * | 11/2012 | Ginzburg | ............. | G06N 99/005 706/13 |
| 8,620,842 B1 * | 12/2013 | Cormack | .......... | G06F 17/30598 706/12 |
| 8,706,742 B1 * | 4/2014 | Ravid | ...................... | G06N 5/04 707/736 |
| 9,122,679 B1 * | 9/2015 | Yu | ...................... | G06F 17/30707 |
| 2003/0154181 A1 * | 8/2003 | Liu | ...................... | G06F 17/3071 |
| 2007/0179945 A1 * | 8/2007 | Marston | ............... | G06Q 10/107 |

(Continued)

OTHER PUBLICATIONS

"Transparent Predictive Coding", http://www.symantec.com/predictive-coding/, as accessed Mar. 25, 2015, all pages, Symantec Corporation, (published on Mar. 8, 2013).

(Continued)

*Primary Examiner* — Benjamin M Thieu
(74) *Attorney, Agent, or Firm* — FisherBroyles, LLP

(57) ABSTRACT

The disclosed computer-implemented method for categorizing electronic messages for compliance reviews may include (1) identifying, as part of a compliance review for an organization, an uncategorized electronic message sent or received by a supervised user within the organization, (2) comparing the uncategorized electronic message with information gathered from previously categorized electronic messages sent or received by supervised users within the organization, (3) determining, based at least in part on the comparison, a relevance level of the uncategorized electronic message with respect to the compliance review, (4) receiving, from a compliance reviewer, feedback indicating whether the determined relevance level is correct, and (5) updating the previously gathered information based on the feedback from the compliance reviewer. Various other methods, systems, and computer-readable media are also disclosed.

18 Claims, 7 Drawing Sheets

(56) References Cited

U.S. PATENT DOCUMENTS

2010/0250573 A1* 9/2010 Mayer .................. G06Q 30/02
707/759

OTHER PUBLICATIONS

"Intelligent Compliance Solutions", http://www.intelligentcompliancesolutions.com/solutions/, as accessed Mar. 25, 2015, all pages, (published on or before Mar. 25, 2015).

"Intelligent Compliance", http://www.bmc.com/forms/DCA-BAS-IntComp-EstabTrustinDataCtr-WP-BMCcom_V2.html, as accessed Mar. 25, 2015, all pages, BMC Software, Inc., (published on or before Mar. 25, 2015).

"Log Rhythm for Compliance and Audit", https://www.logrhythm.com/siem-2.0/logrhythm-security-intelligence/compliance-automation-assurance.aspx, as accessed Mar. 25, 2015, all pages, LogRhythm, Inc., (published on Mar. 31, 2014).

"Welcome to Automated Compliance Solutions", http://www.complianceacs.com/automated-compliance-solutions.php, as accessed Mar. 25, 2015, all pages, (published on Aug. 30, 2010).

"SymantecT™ Security Compliance Solution", http://www.ingrammicro.com/healthcare/Symantec.pdf, as accessed Mar. 25, 2015, all pages, Symantec Corporation, (published on Jun. 2008).

"Viewpoint Assisted Review—A White Paper Explaining Technology-Assisted Review", http://lateraldata.com/pdf/Viewpoint_Assisted_Review White_Paper.pdf, as accessed Mar. 25, 2015, all pages, Viewpoint by Lateral Data, A Xerox Company, (published on Nov. 26, 2013).

* cited by examiner

SYSTEMS AND METHODS FOR CATEGORIZING ELECTRONIC MESSAGES FOR COMPLIANCE REVIEWS

BACKGROUND

Compliance reviews are an important but often tedious process intended to ensure that employees are adhering to regulatory standards. Many different industries (such as finance, manufacturing, and pharmaceuticals) may have regulations that require companies to monitor, supervise, and/or review their employees in some capacity. Some of these regulations may require companies to monitor, supervise, and/or review employees' electronic communications (such as emails and/or instant messages). With hundreds or even thousands of employees sending and/or receiving electronic communications on a daily basis and only a limited number of compliance reviewers, each review of such electronic communications for compliance purposes may amount to a difficult and/or time-consuming task.

The instant disclosure, therefore, identifies and addresses a need for systems and methods for categorizing electronic messages for compliance reviews to increase the efficiency, accuracy, and/or reliability of such compliance reviews.

SUMMARY

As will be described in greater detail below, the instant disclosure describes various systems and methods for categorizing electronic messages for compliance reviews by automatically assigning relevance ratings to messages based at least in part on previously categorized messages with similar characteristics.

In one example, a computer-implemented method for categorizing electronic messages for compliance reviews may include (1) identifying, as part of a compliance review for an organization, an uncategorized electronic message sent or received by a supervised user within the organization, (2) comparing the uncategorized electronic message with information gathered from previously categorized electronic messages sent or received by supervised users within the organization, (3) determining, based at least in part on the comparison, a relevance level of the uncategorized electronic message with respect to the compliance review, (4) receiving, from a compliance reviewer, feedback indicating whether the determined relevance level is correct, and (5) updating the previously gathered information based on the feedback from the compliance reviewer.

In one embodiment, the compliance review may include and/or represent an examination, by the compliance reviewer, of at least a subset of all electronic messages sent or received by the supervised users within the organization. In this embodiment, the compliance review may facilitate determining whether the portion of electronic messages sent or received by the supervised users include any evidence of inappropriate activity by the supervised users.

In some examples, determining the relevance level of the uncategorized electronic message may include examining the uncategorized electronic message for any evidence indicating whether the uncategorized electronic message is an organization-wide mass communication and determining, based at least in part on the examination of the uncategorized electronic message, the relevance level of the uncategorized electronic message. Additionally or alternatively, determining the relevance level of the uncategorized electronic message may include assigning, to the uncategorized electronic message, a high relevance level that is above a relevance threshold due at least in part to examined evidence indicating that the uncategorized electronic message is not an organization-wide mass communication and/or assigning, to the uncategorized electronic message, a low relevance level that is below a relevance threshold due at least in part to examined evidence indicating that the uncategorized electronic message is an organization-wide mass communication.

In some examples, comparing the uncategorized electronic message with the information gathered from the previously categorized electronic messages may include comparing a recipient of the uncategorized electronic message to a recipient of at least one previously categorized electronic message. In further examples, comparing the uncategorized electronic message with the information gathered from the previously categorized electronic messages may include comparing a sender of the uncategorized electronic message to a sender of at least one previously categorized electronic message. In one example, comparing the uncategorized electronic message with the information gathered from the previously categorized electronic messages may include comparing a keyword in the uncategorized electronic message to a keyword in at least one previously categorized electronic message.

Additionally or alternatively, comparing the uncategorized electronic message with the information gathered from the previously categorized electronic messages may include comparing a word frequency statistic derived from the uncategorized electronic message to a word frequency statistic derived from at least one previously categorized electronic message. In some examples, comparing the uncategorized electronic message with the information gathered from the previously categorized electronic messages may include comparing metadata about the uncategorized electronic message to metadata from at least one previously categorized electronic message. Additionally or alternatively, comparing the uncategorized electronic message with the information gathered from previously categorized electronic messages may include comparing a subject, a direction relative to the organization, a domain of a sender, and/or a domain of a recipient of the electronic message with a subject, a direction relative to the organization, a domain of a sender, and/or a domain of a recipient from at least one previously categorized electronic message.

In one embodiment, the computer-implemented method may further include (1) collecting relevance levels assigned to the previously categorized electronic messages, (2) comparing the relevance level of the uncategorized electronic message to the relevance levels assigned to the previously categorized electronic messages, (3) ranking, based at least in part on the relevance levels, a set of electronic messages that include the uncategorized electronic message and the previously categorized electronic messages, and (4) providing the ranked set of electronic messages to the compliance reviewer as part of the compliance review. In some examples, the computer-implemented method may further include deleting the information gathered from the previously categorized electronic messages upon completion of the compliance review and initiation of a new compliance review for the organization.

In one example, determining the relevance level of the uncategorized electronic message may include determining that the uncategorized electronic message is substantially relevant to the compliance review, and receiving the feedback indicating whether the determined relevance level is correct may include receiving feedback indicating that the relevance level is incorrect and the uncategorized electronic message is substantially irrelevant to the compliance review. In this example, updating the previously gathered information based on the feedback may include updating the previously gathered information to indicate that the uncategorized electronic message is substantially irrelevant to the compliance review.

In another example, determining the relevance level of the uncategorized electronic message may include determining that the uncategorized electronic message is substantially irrelevant to the compliance review, and receiving the feedback indicating whether the determined relevance level is correct may include receiving feedback indicating that the relevance level is incorrect and the uncategorized electronic message is substantially relevant to the compliance review. In this example, updating the previously gathered information based on the feedback may include updating the previously gathered information to indicate that the uncategorized electronic message is substantially relevant to the compliance review.

In one embodiment, a system for implementing the above-described method may include (1) an identification module, stored in memory, that identifies, as part of a compliance review for an organization, an uncategorized electronic message sent or received by a supervised user within the organization, (2) a comparison module, stored in memory, that compares the uncategorized electronic message with information gathered from previously categorized electronic messages sent or received by supervised users within the organization, (3) a determination module, stored in memory, that determines, based at least in part on the comparison, a relevance level of the uncategorized electronic message with respect to the compliance review, (4) a receiving module, stored in memory, that receives, from a compliance reviewer, feedback indicating whether the determined relevance level is correct, (5) an updating module, stored in memory, that updates the previously gathered information based on the feedback from the compliance reviewer, and (6) at least one physical processor configured to execute the identification module, the comparison module, the determination module, the receiving module, and the updating module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, as part of a compliance review for an organization, an uncategorized electronic message sent or received by a supervised user within the organization, (2) compare the uncategorized electronic message with information gathered from previously categorized electronic messages sent or received by supervised users within the organization, (3) determine, based at least in part on the comparison, a relevance level of the uncategorized electronic message with respect to the compliance review, (4) receive, from a compliance reviewer, feedback indicating whether the determined relevance level is correct, and (5) update the previously gathered information based on the feedback from the compliance reviewer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
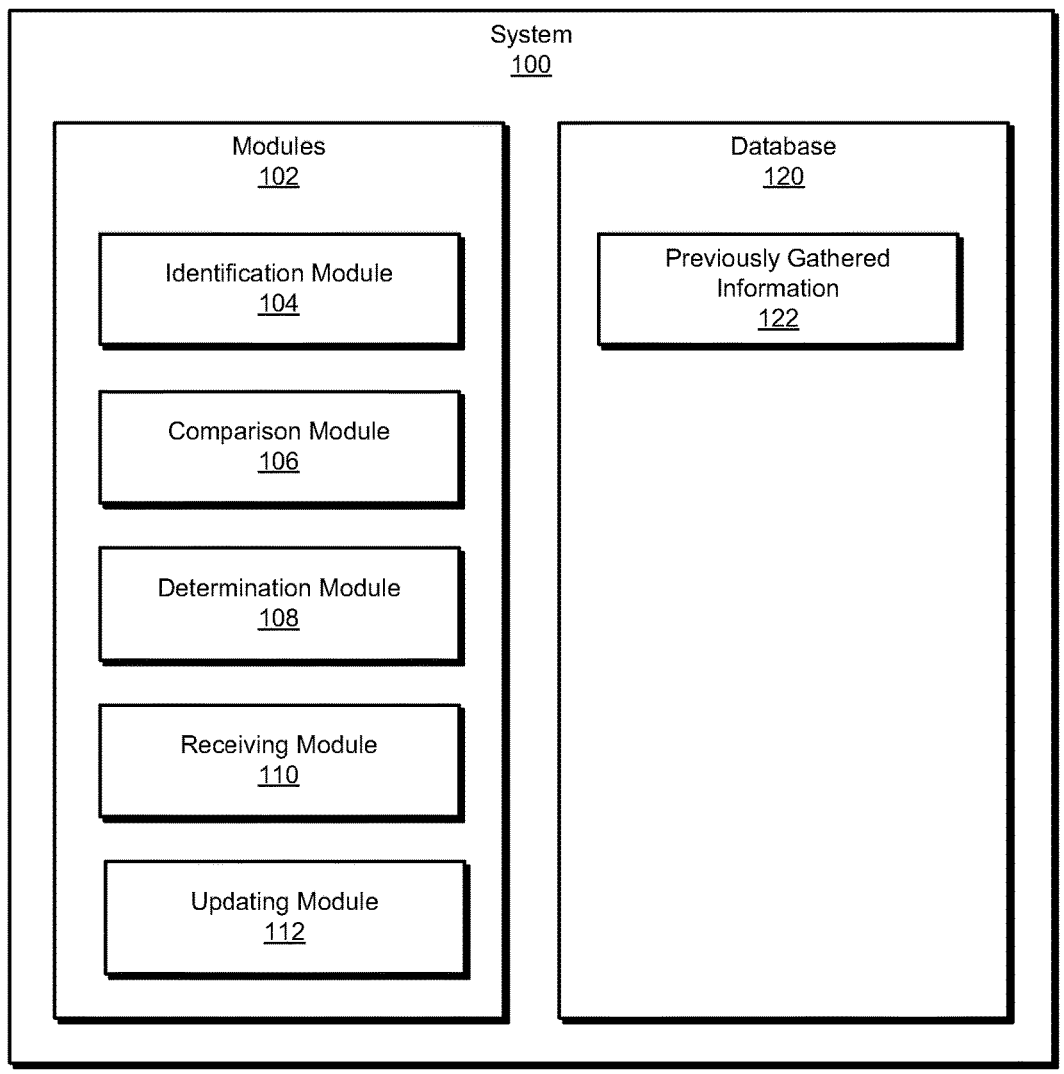
FIG. 1 is a block diagram of an exemplary system for categorizing electronic messages for compliance reviews.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for categorizing electronic messages for compliance reviews. As will be explained in greater detail below, by automatically assigning relevance levels to messages and presenting reviewers with messages sorted by relevance, the systems and methods described herein may enable reviewers to more efficiently and effectively examine large quantities of messages for evidence of inappropriate behavior. By categorizing messages by their likely relevance, continually using feedback from reviewers to improve the categorization algorithm, and presenting ever-more-relevant messages, the systems described herein may create a self-improving relevancy categorization mechanism that continuously improves the efficiency and effectiveness of compliance reviews. Increasing the efficiency of compliance reviews may allow organizations to expend fewer resources on compliance reviews while catching regulatory violations more quickly and effectively than before.

The following will provide, with reference to FIGS. 1-2 and 4-5, detailed descriptions of exemplary systems for categorizing electronic messages for compliance reviews. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for categorizing electronic messages for compliance reviews. As illustrated in this figure, exemplary system 100 may include one or more modules 102 for performing one or more tasks. For example, and as will be explained in greater detail below, exemplary system 100 may include an identification module 104 that identifies, as part of a compliance review for an organization, an uncategorized electronic message sent or received by a supervised user within the organization. Exemplary system 100 may additionally include a comparison module 106 that compares the uncategorized electronic message with information gathered from previously categorized electronic messages sent or received by supervised users within the organization.

Exemplary system 100 may also include a determination module 108 that determines, based at least in part on the comparison, a relevance level of the uncategorized electronic message with respect to the compliance review. Exemplary system 100 may additionally include a receiving module 110 that receives, from a compliance reviewer, feedback indicating whether the determined relevance level may be correct. Exemplary system 100 may also include an updating module 112 that updates the previously gathered information based on the feedback from the compliance reviewer. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-202(n) and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store previously gathered information 122 about previously categorized emails. The term "previously gathered information" or "information gathered from previously categorized electronic messages," as used herein, generally refers to any information and/or data about characteristics of a message that suggest relevance or irrelevance to a compliance review. In some examples, previously gathered information 122 may include a manually created data set that is composed of messages manually categorized by compliance reviewers during the current compliance review and/or one or more previous compliance reviews.

In other examples, the previously gathered information 122 may include information that the systems described herein have generated based on feedback from one or more compliance reviewers. In some examples, previously gathered information 122 may include information gathered over the course of several compliance reviews, while in other examples, previously gathered information 122 may only include information gathered in the course of the current compliance review. In some embodiments, the set of previously gathered information may be empty at the start of a compliance review and/or the systems described herein may only automatically categorize messages after a certain threshold for previously gathered information is reached.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
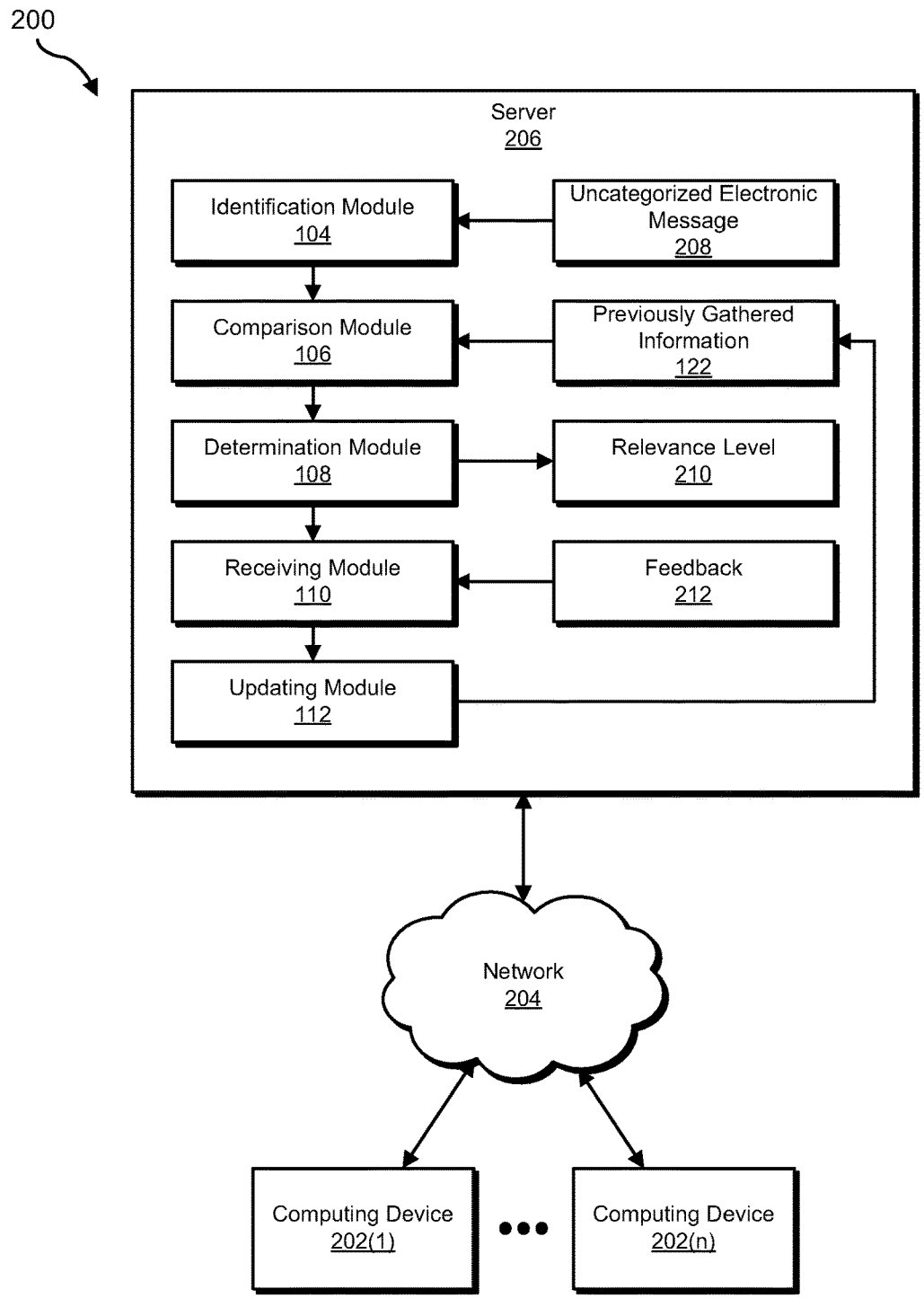
FIG. 2 is a block diagram of an additional exemplary system for categorizing electronic messages for compliance reviews.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more computing devices 202(1)-202(n) in communication with a server 206 via a network 204. In one example, computing devices 202(1)-202(n) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing devices 202(1)-202(n) and/or server 206, enable computing devices 202(1)-202(n) and/or server 206 to categorize electronic messages for compliance reviews. For example, and as will be described in greater detail below, identification module 104 may identify, as part of a compliance review for an organization, an uncategorized electronic message 208 sent or received by a supervised user within the organization. After uncategorized electronic message 208 has been identified, comparison module 106 may compare uncategorized electronic message 208 with information 122 gathered from previously categorized electronic messages sent or received by supervised users within the organization. Next, determination module 108 may determine, based at least in part on the comparison, a relevance level 210 of uncategorized electronic message 208 with respect to the compliance review. At some later time, receiving module 110 may receive, from a compliance reviewer, feedback 212 indicating whether the determined relevance level 210 is correct. Finally, updating module 112 may update previously gathered information 122 based on feedback 212 from the compliance reviewer.

Computing devices 202(1)-202(n) generally represents any type or form of computing devices capable of reading computer-executable instructions. Examples of computing devices 202(1)-202(n) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device capable of categorizing emails for compliance reviews. Examples of server 206 include, without limitation, application servers, security servers, web servers, storage servers, policy and/or compliance servers, deduplication servers, and/or database servers configured to run certain software applications and/or provide various security, web, storage, policy, compliance deduplication, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing devices 202(1)-202(n) and server 206.

Uncategorized electronic message 208 generally represents any type of electronic message sent or received using a computing device. In one example, uncategorized electronic message 208 may include and/or represent any message sent from one individual, group, and/or server to another via electronic means. An electronic message may include text, pictures, video, audio, and/or other files. Some examples of uncategorized electronic message 208 include, without limitation, an email, a text message, an instant message, a chat message (e.g., via GCHAT and/or internet relay chat (IRC)), a social networking website message (e.g., via LINKEDIN and/or FACEBOOK), and/or an audio call and/or meeting (e.g., via SKYPE and/or LYNC).

Relevance level 210 generally represents any categorical determination of likely relevance to a compliance review. In some examples, relevance level 210 may include two options, "relevant" and "not relevant." In other examples, relevance level 210 may include multiple options, such as, "irrelevant," "unlikely to be relevant," "probably relevant," and/or "highly relevant." In some embodiments, relevance level 210 may match a relevance level system used by compliance reviewers. For example, a compliance review may mandate that reviewers mark emails as, "irrelevant," "questionable," and/or "escalate to supervisor." In this example, the systems described herein may categorized emails as "potentially irrelevant," "potentially questionable," and/or "potentially escalate to supervisor." In some examples, regulations may prohibit automated systems from influencing reviewers. In these examples, relevance level 210 may be presented as "highlighted" and "not highlighted." Additionally or alternatively, relevance level 210 may include a numerical score, such as a percentage probability that the message is relevant to the compliance review.

Feedback 212 generally represents any input entered by and/or received from a compliance reviewer. In one example, feedback 212 may indicate a relevance level of a message. Additionally or alternatively, feedback 212 may indicate whether a relevance level is accurate and/or inaccurate. Examples of feedback 212, without limitation, pushing a button that indicates whether or not a calculated relevance level of a message is correct, selecting a relevance level of a message from a list, and/or taking an action that implies a relevance level of a message. For example, a compliance reviewer may provide feedback 212 by escalating a message to his or her supervisor, thereby implying that the message is highly relevant. In another example, a compliance reviewer may provide feedback 212 more directly by checking a box labeled "calculated compliance level is correct."

Figure 3:
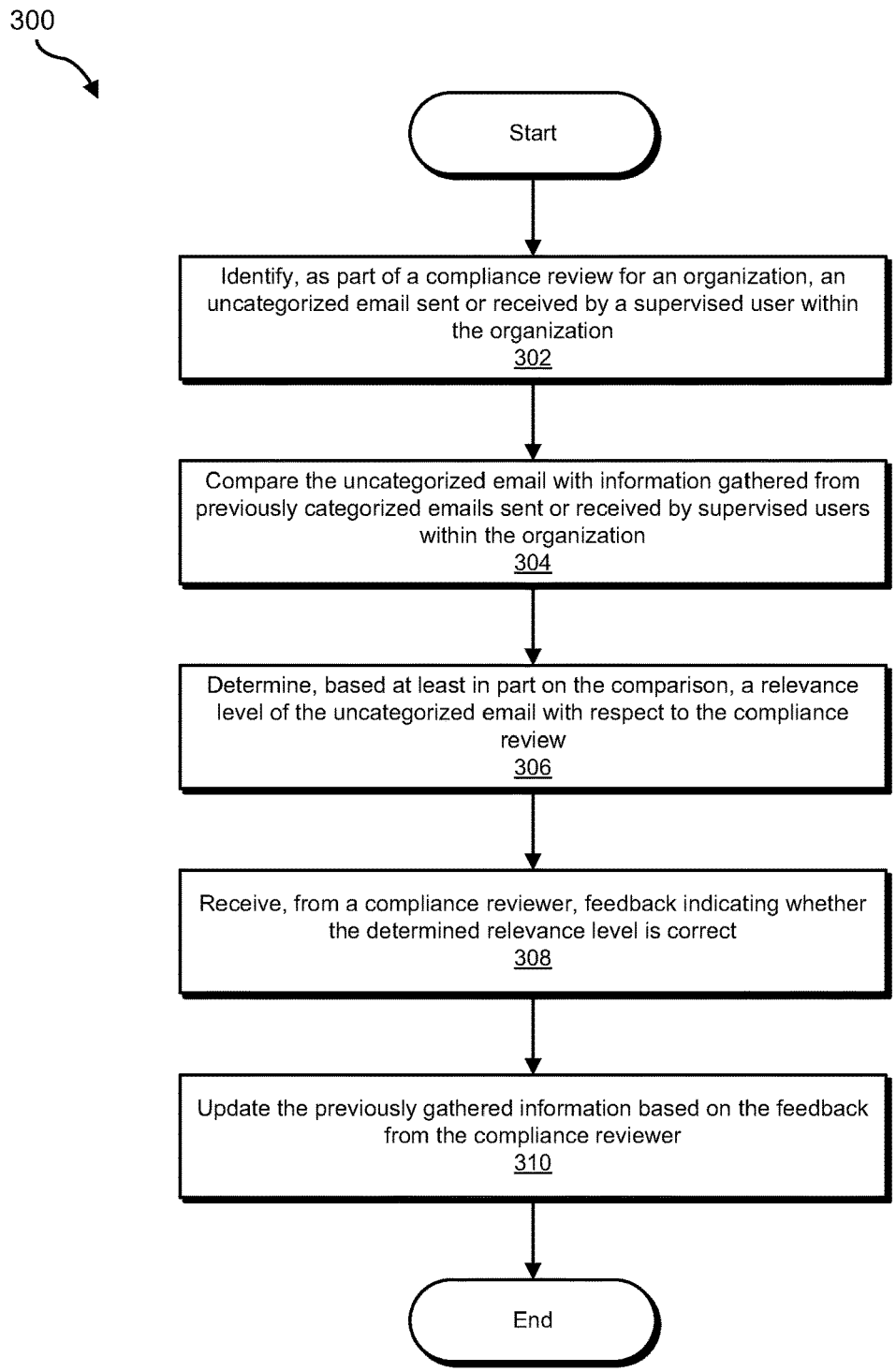
FIG. 3 is a flow diagram of an exemplary method for categorizing electronic messages for compliance reviews.

FIG. 3 is a flow diagram of an exemplary computer-implemented method 300 for categorizing electronic messages for compliance reviews. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify, as part of a compliance review for an organization, an uncategorized electronic message sent or received by a supervised user within the organization. For example, identification module 104 may, as part of server 206 in FIG. 2, identify, as part of a compliance review for an organization, uncategorized electronic message 208 sent or received by a supervised user within the organization.

The term "compliance review," as used herein, generally refers to any type or form of review of communications and/or behavior of certain employees of an organization. In one example, a compliance review may be performed in an attempt to comply with regulatory compliance requirements. Additionally or alternatively, a compliance review may be performed in an attempt to ensure that users and/or employees are not violating certain organizational guidelines and/or policies (such as sexual harassment policies).

In some examples, a compliance review may include an examination by one or more compliance reviewers of at least a subset of all electronic messages sent or received by the supervised users within the organization. In these examples, the compliance reviewers may attempt to determine whether the portion of electronic messages sent or received by the supervised users includes any evidence of inappropriate activity by the supervised users. Such inappropriate activity may include and/or represent illegal and/or unethical activity (e.g., sexual harassment, insider trading, price fixing, and/or insecure handling of confidential data).

The term "supervised user," as used herein, generally refers to any user, employee, and/or member whose behavior and/or communications are subjected to a compliance review. In some examples, a supervised user may be any employee of an organization. In other examples, a supervised user may be a certain category of employee. For example, a regulation may mandate that all employees with access to customer financial data (such as brokers) be supervised and/or monitored, but employees without such access (such as human resources personnel) may not require such supervision or monitoring. Additionally or alternatively, a supervised user may be a specific user who has come under scrutiny for possible inappropriate behavior.

Identification module 104 may identify uncategorized electronic message 208 in a variety of ways and/or contexts. For example, identification module 104 may identify any message sent from or to a supervised user as an eligible message for the compliance review. In some examples, identification module 104 may only identify messages after the messages have passed through a spam filter and/or malware detection system and have been classified as non-malicious non-spam messages. In some instances, regulations may require a reviewer to examine a randomly sampled percentage of messages sent or received within an organization. In these instances, identification module 104 may identify a random subset of messages as candidates for the compliance review.

At step 304 in FIG. 3, one or more of the systems described herein may compare the uncategorized electronic message with information gathered from previously categorized electronic messages sent or received by supervised users within the organization. For example, comparison module 106 may, as part of server 206 in FIG. 2, compare uncategorized electronic message 208 with information 122 gathered from previously categorized electronic messages sent or received by supervised users within the organization.

Comparison module 106 may compare uncategorized electronic message 208 with previously gathered information 122 in a variety of ways. For example, comparison module 106 may compare uncategorized electronic message 208 with previously categorized messages in order to determine the relevance level of the previously categorized messages with the greatest similarity to the uncategorized message. In one example, comparison module 106 may compare several different message characteristics of uncategorized electronic message 208 with characteristics of previously categorized messages and/or may weight the message characteristics in order to determine overall similarity.

In some examples, comparison module 106 may compare uncategorized electronic message 208 with previously gathered information 122 by comparing a recipient, a sender, one or more keywords and/or key phrases, a word frequency statistic, a subject, a direction relative to the organization (e.g., from an internal email address to an external email address or vice versa), a domain of a sender, a domain of a recipient, and/or additional metadata of uncategorized electronic message 208 to a recipient, a sender, one or more keywords and/or key phrases, a word frequency statistic, a subject, a direction, a domain of a sender, a domain of a recipient, and/or additional metadata of at least one previously categorized electronic message. In some embodiments, a recipient may include an email address in the "to," "cc," and/or "bcc" field of an email and/or recipients in the various fields may be treated differently with respect to potential relevance. For example, a message with one or more recipients in the "bcc" field may be more likely to be relevant to the compliance review than a message with no recipients in the "bcc" field. In some embodiments, a keyword may include a word stem. For example, a keyword "embezzl" may match on the words "embezzler," "embezzling," "embezzled" and/or "embezzle."

In one example, if previous messages from or to a certain user have typically been marked as relevant, comparison module 106 may report that uncategorized electronic message 208 is similar to messages determined to be relevant. In another example, previously categorized messages that include the phrase "financial news" one or more times may have been marked as highly relevant. In this example, uncategorized electronic message 208 may be highly relevant if it includes several mentions of the phrase "financial news." In another example, messages that include the phrase "financial news" but also include the phrase "annual public summary" may have been previously categorized as not relevant.

In another example, previously categorized messages sent during non-working hours, such as between 6 p.m. and 5 a.m., may have been more likely to be categorized as relevant. In this example, if uncategorized electronic message 208 was sent at 1 A.M., comparison module 106 may report that uncategorized electronic message 208 is similar to messages marked as relevant.

At step 306 in FIG. 3, one or more of the systems described herein may determine, based at least in part on the comparison, a relevance level of the uncategorized electronic message with respect to the compliance review. For example, determination module 108 may, as part of server 206 in FIG. 2, determine, based at least in part on the comparison, relevance level 210 of uncategorized electronic message 208 with respect to the compliance review.

Determination module 108 may determine relevance level 210 of uncategorized electronic message 208 in a variety of ways. For example, determination module 108 may use information about the relevance level of similar messages and/or pre-defined rules for compliance review relevance to determine relevance level 210. Additionally or alternatively, determination module 108 may determine relevance level 210 based at least in part on the sender and/or recipient of uncategorized electronic message 208.

Figure 4:
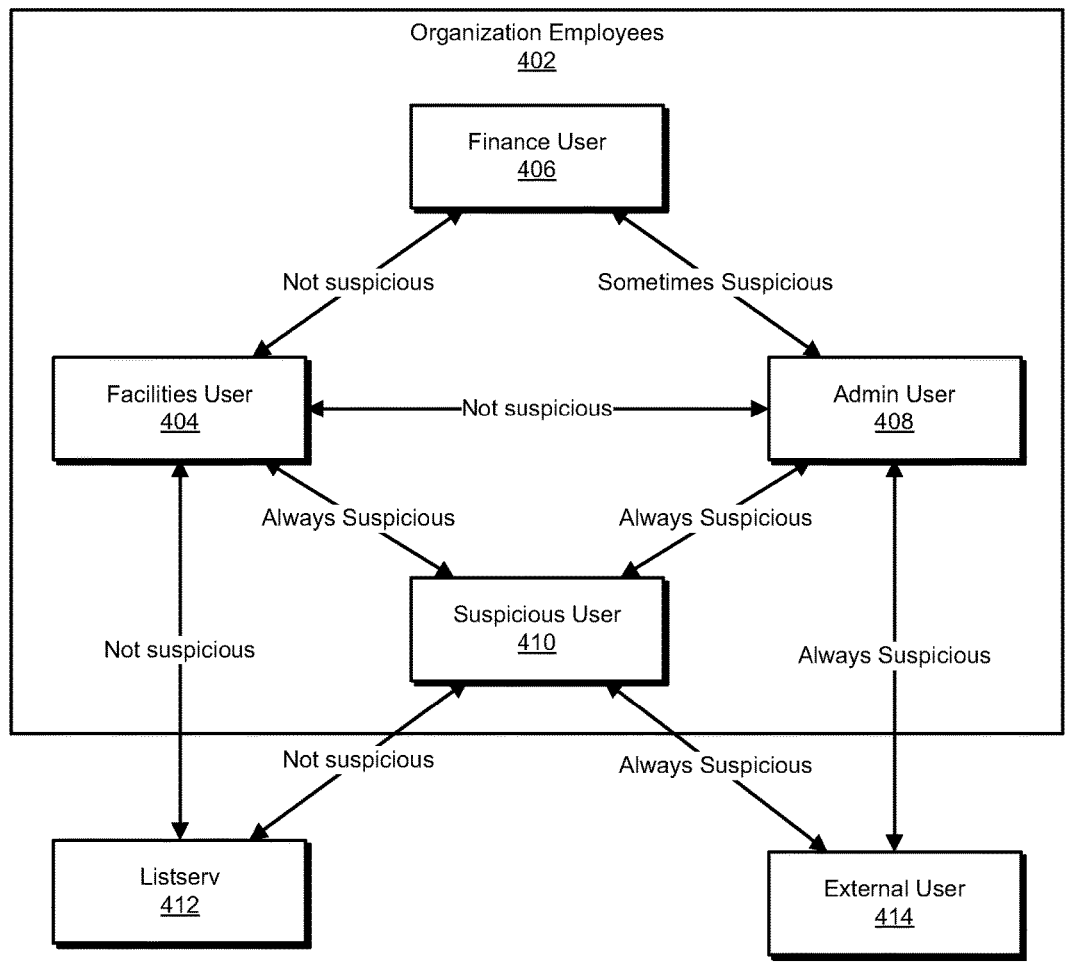
FIG. 4 is a block diagram of an additional exemplary system for categorizing electronic messages for compliance reviews.

As a specific example, determination module 108 may determine the relevance levels of electronic messages exchanged within an organization in connection with exemplary implementation 400 in FIG. 4. As illustrated in FIG. 4, implementation 400 may involve organization employees 402 communicating with each other and/or with external users and/or lists. In this example, organization employees 402 may include a facilities user 404, a finance user 406, an admin user 408, and/or a suspicious user 410. In one example, facilities user 404 may regularly communicate with users in many departments as part of his or her job. Accordingly, communication between facilities user 404 and finance user 406 and/or admin user 408 may not be suspicious and, as a result, may be unlikely to be relevant to a compliance review.

In one example, finance user 406 may not typically communicate with admin user 408 and/or may only communicate about certain subjects and/or topics. As a result, some communications between finance user 406 and admin user 408 may be suspicious and thus may be relevant to the compliance review. In some examples, determination module 108 may only mark messages exchanged between finance user 406 and admin user 408 as relevant to the compliance review if the messages include keywords identified as appearing in highly relevant messages.

In some examples, suspicious user 410 may be an employee of the organization who is under suspicion for inappropriate behavior. In these examples, any messages sent to or from suspicious user 410 may be subject to increased scrutiny and thus determination module 108 may mark all such messages as relevant. In some examples, one or more supervised users, such as finance user 406 and/or suspicious user 410, may be subscribed to a listserv 412. Listserv 412 may send irrelevant mass messages such as newsletters, coupons, and/or public discussions that are hardly relevant to a compliance review. In some embodiments, determination module 108 may categorize all messages sent to or from listserv 412 as irrelevant even if those messages would otherwise be marked as relevant. In some examples, communication with non-employees, such as an external user 414, may be suspicious and/or inherently inappropriate. In these examples, determination module 108 may determine that all messages sent to or from external user 414 are relevant to the compliance review.

In some examples, determination module 108 may determine relevance level 210 by examining uncategorized electronic message 208 for any evidence indicating whether uncategorized electronic message 208 is an organization-wide mass communication such as a scheduled report, an event invitation, an announcement, and/or any other type innocuous mass communication. In some examples, determination module 108 may assign uncategorized electronic message 208 a high relevance level that is above a relevance threshold due at least in part to examined evidence indicating that uncategorized electronic message 208 is not an organization-wide mass communication. Additionally or alternatively, determination module 108 may assign a low relevance level that is below the relevance threshold due at least in part to examined evidence indicating that uncategorized electronic message 208 is an organization-wide mass communication. For example, determination module 108 may determine that an email sent to at least 80% of an organization should be categorized as irrelevant. In another example, determination module 108 may determine that any email sent to more than half of a company that includes keywords such as "picnic," "fundraiser," and/or "team-building" may be irrelevant. Additionally or alternatively, determination module 108 may determine that an email sent to 10% of an organization is not a mass communication and is relevant.

In some embodiments, determination module 108 may determine relevance levels for multiple messages and present the categorized messages to the compliance reviewer in a list. In one example, the systems described herein may collect relevance levels assigned to previously categorized electronic messages that have been recently categorized and have not yet been presented to a compliance reviewer and may compare the relevance level of electronic message 208 to the relevance levels assigned to the recently categorized electronic messages. The systems described herein may then rank, based at least in part on the relevance level of electronic message 208 and the relevance levels of the recently categorized electronic messages, a set of electronic messages that includes electronic message 208 and the recently categorized electronic messages and may provide the ranked set of electronic messages to the compliance reviewer as part of the compliance review. For example, the systems described herein may list the ranked messages in order from "highly relevant," to "possibly relevant," to "not relevant." In another embodiment, the system described herein may list the ranked messages in order of likely relevance and/or may visually highlight any messages with a relevance level that exceeds a certain threshold.

In some examples, regulations may require that a compliance reviewer examine a certain portion of messages. In some embodiments, the systems described herein may create a review set of the most likely to be relevant messages for display to the compliance reviewer. For example, a regulation may require a reviewer to examine 3% of emails sent or received within an organization. In this example, the systems described herein may present a ranked set of the top 3% of emails most likely to be relevant as categorized by the systems described herein.

Returning to FIG. 3, at step 308, one or more of the systems described herein may receive, from a compliance reviewer, feedback indicating whether the determined relevance level is correct. For example, receiving module 110 may, as part of server 206 in FIG. 2, receive, from a compliance reviewer, feedback 212 indicating whether the determined relevance level 210 is correct and/or accurate. In other words, feedback 212 may indicate whether message 208 was correctly and/or accurately categorized in terms of relevancy with respect to the compliance review.

Receiving module 110 may receive feedback 212 from a compliance reviewer in a variety of ways. In some examples, a compliance reviewer may intentionally provide feedback 212 to receiving module 110. In one such example, a compliance reviewer may press a button that indicates whether or not relevance level 210 for electronic message 208 is correct and/or accurate.

In another example, a reviewer may select the correct relevance level from a dropdown list in order to provide feedback 212. In other embodiments, receiving module 110 may infer feedback 212 from a compliance reviewer's actions. For example, a compliance reviewer may delete electronic message 208 from his or her review queue without opening it. This deletion may imply that the reviewer considers electronic message 208 to be irrelevant. In another example, a compliance reviewer may flag electronic message 208 for further research and/or may forward electronic message 208 to his or her supervisor. This flagging and/or forwarding may indicate that the reviewer considers electronic message 208 to be highly relevant.

In some examples, a compliance reviewer may highlight important words or phrases in electronic message 208. In these examples, receiving module 110 may receive the feedback that the highlighted words or phrases should be positively weighted when determining the relevance of future messages.

At step 310 in FIG. 3, one or more of the systems described herein may update the previously gathered information based on the feedback from the compliance reviewer. For example, updating module 112 may, as part of server 206 in FIG. 2, update previously gathered information 122 based on feedback 212 from the compliance reviewer.

Updating module 112 may update previously gathered information 122 in a variety of ways and/or contexts. For example, updating module 112 may update previously gathered information 122 when a reviewer indicates that relevance level 210 for message 208 is incorrect. In this example, updating module 112 may update previously gathered information 122 by lowering the weight of the factors that led to message 208 being incorrectly categorized as relevant. In other embodiments, updating module 112 may also update previously gathered information 122 when a reviewer confirms that relevance level 210 is correct. In one example, updating module 112 may update previously gathered information 122 by assigning a higher weight to keywords that appeared frequently in a set of emails that a reviewer has recently categorized as relevant. In another example, updating module 112 may lower the weight of an item of metadata that was found in a message that a reviewer categorized as not relevant.

In some examples, updating module 112 may update previously gathered information 122 by adding information about electronic message 208 to previously gathered information 122. For example, relevance level 210 may indicate and/or suggest that electronic message 208 is substantially relevant to the compliance review. In this example, receiving module 110 may receive feedback 212 indicating that relevance level 210 is incorrect and electronic message 208 is substantially irrelevant to the compliance review. As a result, updating module 112 may update previously gathered information 122 based on feedback 212 by modifying previously gathered information 122 to indicate that electronic message 208 is substantially irrelevant to the compliance review. Additionally or alternatively, updating module 112 may decrease the weight of characteristics that were used to determine that electronic message 108 was relevant.

In another example, updating module 112 may update previously gathered information 122 by adding different information about electronic message 208 to previously gathered information 112. For example, relevance level 210 may indicate and/or suggest that electronic message 208 is substantially irrelevant to the compliance review. In this example, receiving module 110 may receive feedback 212 indicating that relevance level 210 is incorrect and electronic message 208 is substantially relevant to the compliance review. As a result, updating module 112 may update previously gathered information 122 based on feedback 212 by modifying previously gathered information 122 to indicate that electronic message 208 is substantially relevant to the compliance review. Additionally or alternatively, updating module 112 may increase the weight of characteristics of electronic message 208.

In some examples, systems described herein may delete previously gathered information 122 upon completion of the compliance review and initiation of a new compliance review for the organization. For example, the standards of a regulatory agency may change between compliance reviews, and previously irrelevant messages may now be relevant and vice versa. In another example, employees, company focus, organizational structure, and/or corporate culture may change during the time between compliance reviews, causing a shift in messaging patterns and/or keyword usage that renders the previous data set ineffective at categorizing relevant messages.

In some examples, different types of compliance reviews may have different needs. For example, one compliance review may be undertaken to ensure that employees are not disclosing confidential information, while another may be initiated to ensure that employees are not violating sexual harassment policies. In this example, the algorithms that detect messages relevant to the former review may be less useful at finding messages that are relevant to the latter review. By clearing out-of-date information and beginning a new data set, the systems described herein may be able to more accurately determine relevance levels for electronic messages that are part of the new compliance review.

Figure 5:
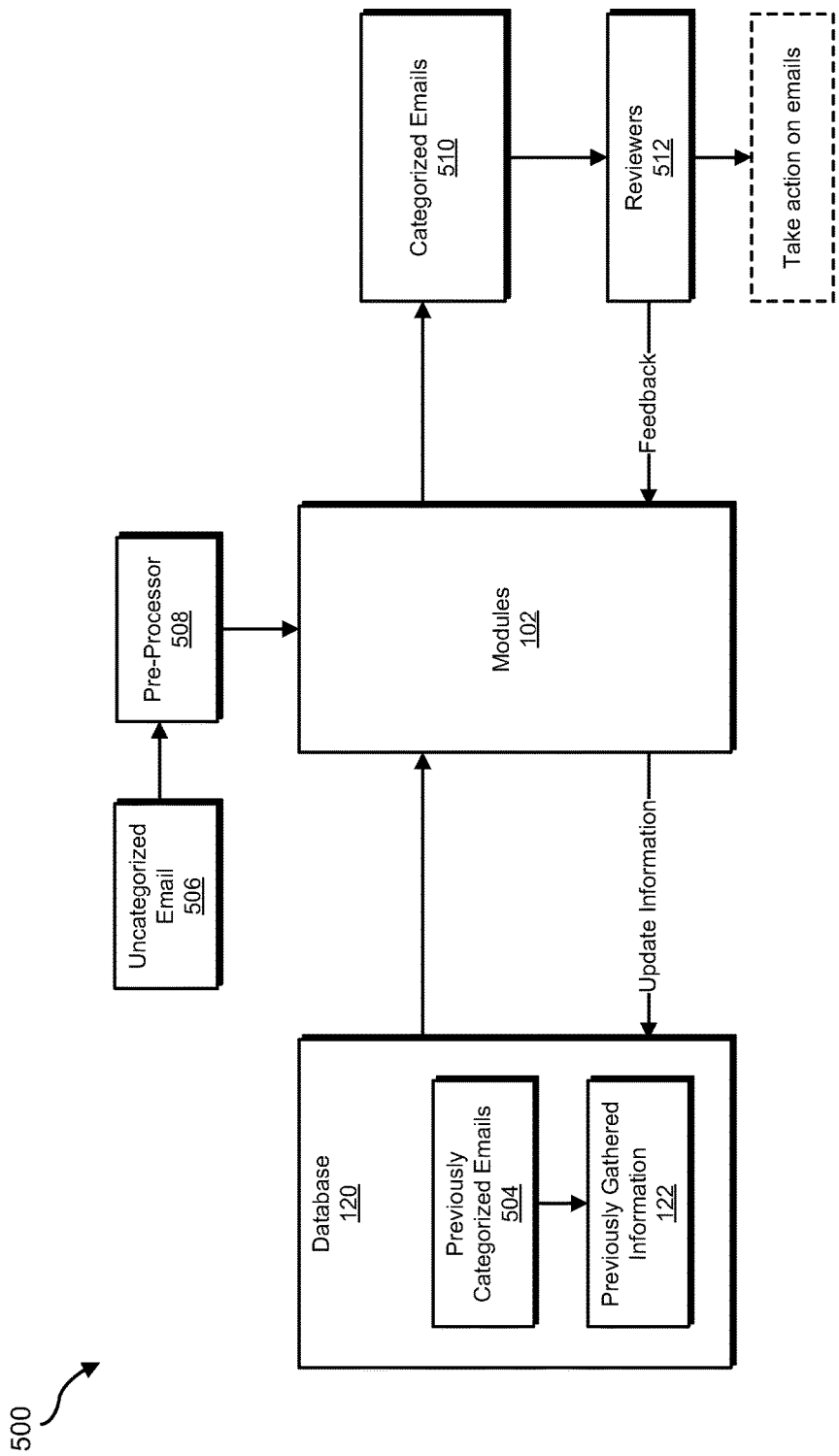
FIG. 5 is a block diagram of an additional exemplary system for categorizing electronic messages for compliance reviews.

The systems and methods described herein may be implemented in a number of ways. FIG. 5 is a block diagram of an exemplary computing system 500 for categorizing electronic messages for compliance reviews. As illustrated in FIG. 5, database 120 may include previously categorized emails 504 and/or previously gathered information 122 that has been formulated based on previously categorized emails 504. For example, if a large number of previously categorized emails 504 that were categorized as relevant included the keywords "stocks," "increasing," and/or "shares," while only a small number of irrelevant emails within previously categorized emails 504 include those keywords, previously gathered information 122 may include a listing of the words "stocks," "increasing," and/or "shares" along with high weights for potential relevance. Modules 102 may use previously gathered information 122 to evaluate uncategorized emails, such as an uncategorized email 506.

Uncategorized email 506 may first be processed by pre-processor 508. Pre-processor 508 may format and/or parse uncategorized email 506 so that modules 102 can easily compare uncategorized email 506 to previously gathered information 122. For example, pre-processor 508 may extract and/or format text, metadata, attachments, images, signatures, markup, and the like. Modules 102 may analyze uncategorized email 506 and assign it a probable relevance level before adding it to the pool of categorized emails 510. The systems described herein may display categorized emails 510 to one or more reviewers 512. Reviewers 512 may take actions on any or all of categorized emails 510 and/or may send feedback to modules 102, which modules 102 may use to improve the effectiveness of previously gathered information 122. As the next uncategorized email arrives, modules 102 may use the updated previously gathered information 122 to more accurately predict the probable relevance level, thereby improving the quality of categorized emails 510. The systems described herein may use each item of feedback from reviewers 512 to improve previously gathered information 122, continuously improving the quality of categorized emails 510, and/or increasing the efficiency of reviewers 512.

As explained in connection with method 300 above, the systems and methods described herein may improve the quality of a compliance review set by automatically categorizing messages based on similarity to previously categorized messages. The systems described herein may analyze word frequency in messages and/or other message properties in order to determine which messages are most likely to be relevant. Once a reviewer has manually determined whether a message is relevant or not, the systems described herein may use feedback from the reviewer to improve the effectiveness of the data set that facilitates the initial categorization of certain messages. By presenting a reviewer with a sorted list of the messages most likely to be relevant, the systems described herein may reduce the amount of time needed for a reviewer to examine the most relevant messages and/or decrease the chances that a reviewer may miss an important message. By allowing reviewers to find relevant information more quickly, the systems described herein may reduce the burden of regulatory compliance for organizations.

Figure 6:
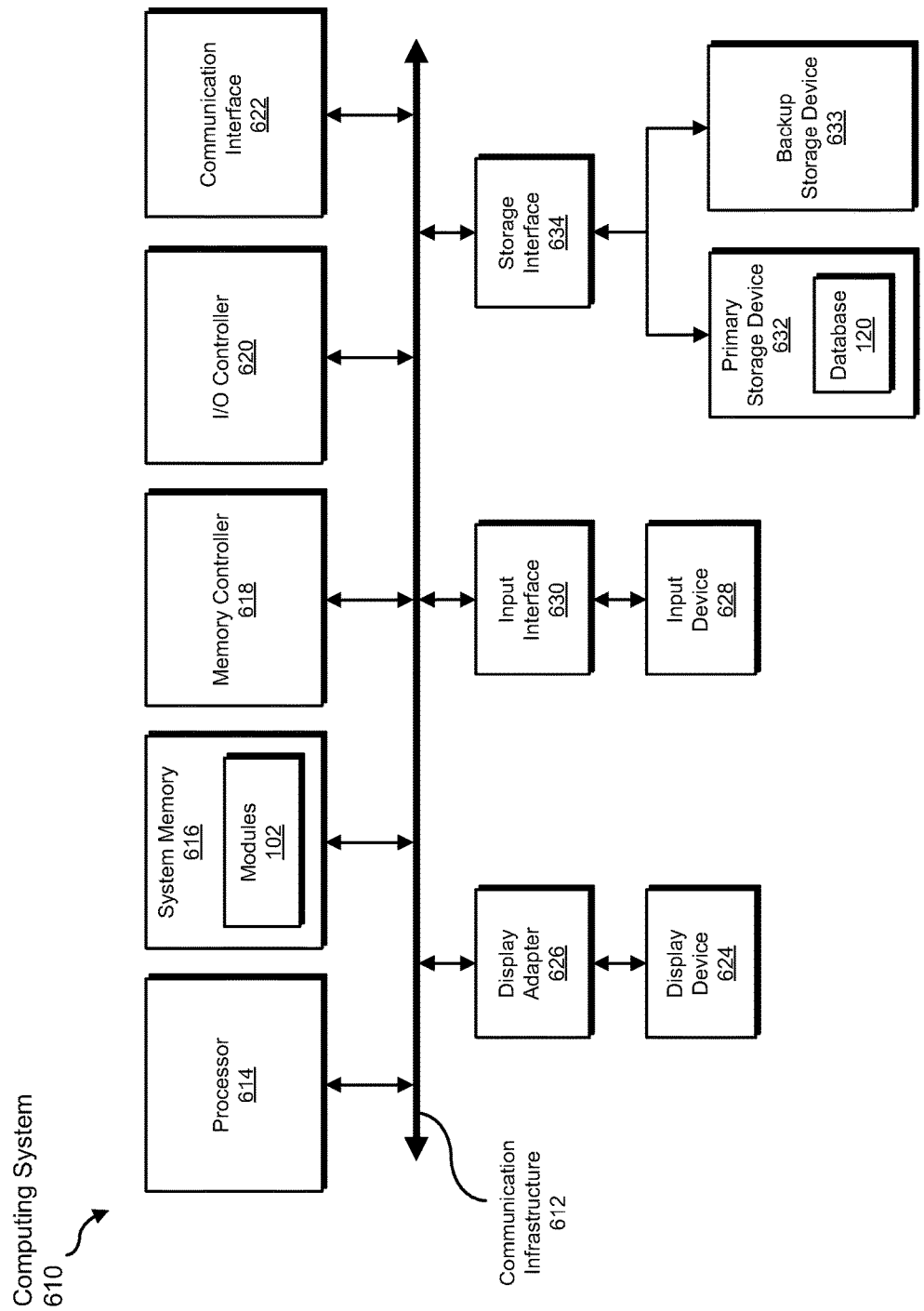
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
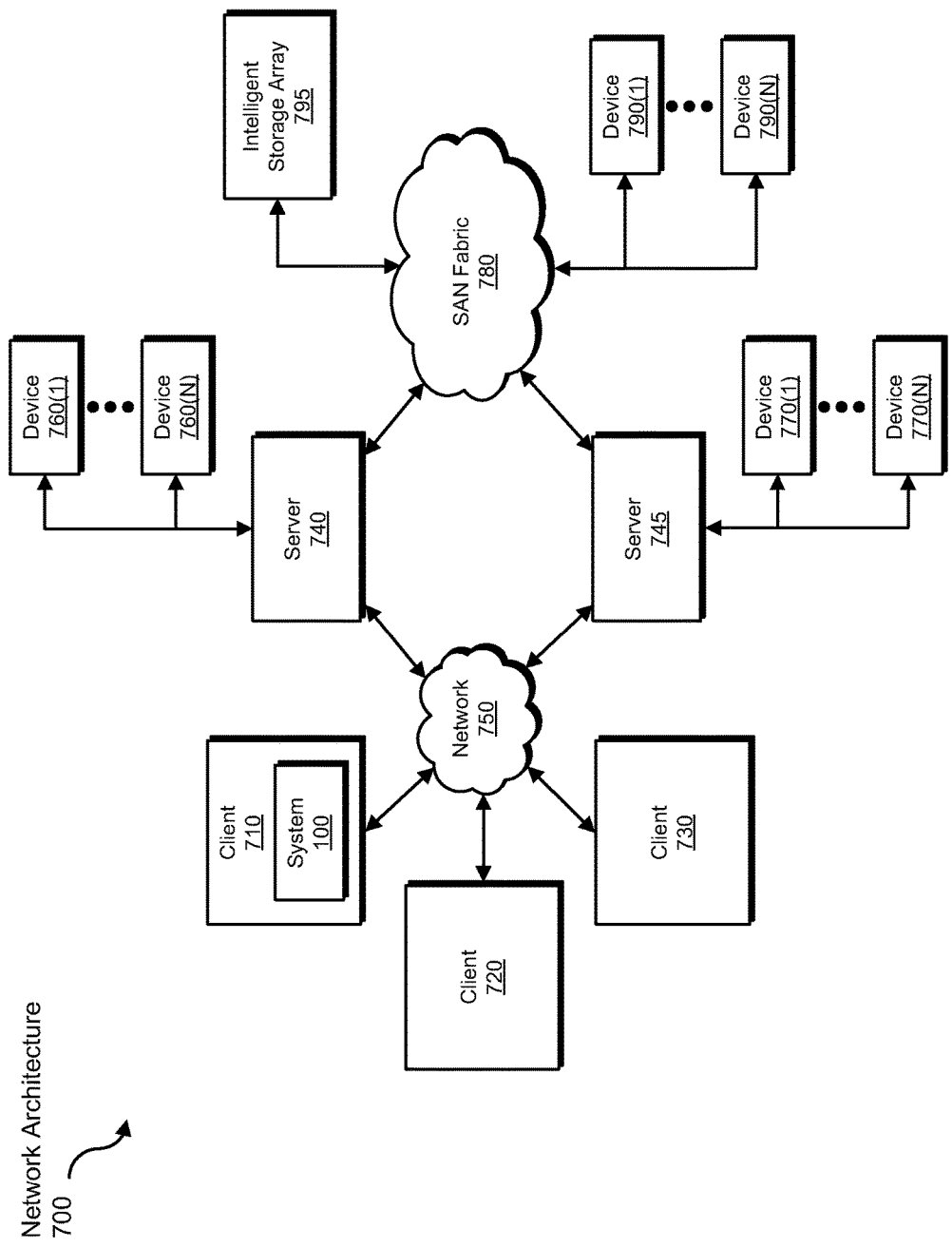
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for categorizing electronic messages for compliance reviews.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a batch of electronic messages to be transformed, transform the batch of electronic messages into a sorted list of electronic messages, output a result of the transformation to an interface used by a compliance reviewer, use the result of the transformation to display the sorted list of electronic messages, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for categorizing electronic messages for compliance reviews, at least a portion of the method being performed by a computing device comprising at least one processor and a memory, the method comprising:
   identifying, as part of a compliance review for an organization, an uncategorized electronic message sent or received by a supervised user within the organization;
   comparing the uncategorized electronic message with information gathered from previously categorized electronic messages sent or received by supervised users within the organization;
   determining, by a determining module stored in the memory, based at least in part on the comparison, a relevance level of the uncategorized electronic message with respect to the compliance review, wherein the relevance level is determined by at least identifying a keyword in the uncategorized electronic message that appears in at least one of the previously categorized electronic messages sent or received by at least a predetermined threshold of the supervised users within the organization, assigning, to the uncategorized electronic message, a first relevance level that is above a relevance threshold due at least in part to examined evidence indicating that the uncategorized electronic message is not a communication comprising at least one of a scheduled report, an event invitation, or an announcement sent or received by the supervised users, wherein the first relevance level corresponds to electronic messages that are not included in the communication, and assigning, to the uncategorized electronic message, a second relevance level that is below the relevance threshold due at least in part to examined evidence indicating that the uncategorized electronic message is the communication, wherein the second relevance level corresponds to electronic messages that are included in the communication;
   determining, by the determining module stored in the memory, whether the uncategorized electronic message was received from a listserv by the supervised user within the organization, wherein upon determining that the uncategorized message was received from the listserv, the uncategorized electronic message is categorized as not relevant with respect to the compliance review irrespective of the relevance level determined by the identified keyword;
   receiving, from a compliance reviewer, feedback indicating whether the determined relevance level is correct;
   updating the previously gathered information based on the feedback from the compliance reviewer;
   presenting, in an interface, a list of electronic messages ranked according to the determined relevance level, wherein the list includes visual highlighting applied to the electronic messages corresponding to the determined relevance level, thereby decreasing a likelihood of a reviewer missing a relevant electronic message.

2. The computer-implemented method of claim 1, wherein the compliance review comprises an examination, by the compliance reviewer, of at least a subset of all electronic messages sent or received by the supervised users within the organization, wherein in order to determine whether the subset of electronic messages sent or received by the supervised users includes any evidence of at least one activity by the supervised users.

3. The computer-implemented method of claim 1, wherein determining the relevance level of the uncategorized electronic message further comprises:
   examining the uncategorized electronic message for any evidence indicating whether the uncategorized electronic message is the communication comprising the at least one of a scheduled report, an event invitation, or an announcement sent or received by the supervised users;
   determining, based at least in part on the examination of the uncategorized electronic message, the relevance level of the uncategorized electronic message.

4. The computer-implemented method of claim 1, wherein comparing the uncategorized electronic message with the information gathered from the previously categorized electronic messages comprises comparing a recipient of the uncategorized electronic message to a recipient of at least one previously categorized electronic message.

5. The computer-implemented method of claim 1, wherein comparing the uncategorized electronic message with the information gathered from the previously categorized electronic messages comprises comparing a sender of the uncategorized electronic message to a sender of at least one previously categorized electronic message.

6. The computer-implemented method of claim 1, wherein comparing the uncategorized electronic message with the information gathered from the previously categorized electronic messages comprises comparing the keyword in the uncategorized electronic message to a keyword in at least one previously categorized electronic message.

7. The computer-implemented method of claim 1, wherein comparing the uncategorized electronic message with the information gathered from the previously categorized electronic messages comprises comparing a word frequency statistic derived from the uncategorized electronic message to a word frequency statistic derived from at least one previously categorized electronic message.

8. The computer-implemented method of claim 1, wherein comparing the uncategorized electronic message with the information gathered from the previously categorized electronic messages comprises at least one of:
   comparing metadata about the uncategorized electronic message to metadata from at least one previously categorized electronic message;
   comparing a subject of the uncategorized electronic message to a subject from at least one previously categorized electronic message;
   comparing a direction of the uncategorized electronic message relative to the organization to a direction from at least one previously categorized electronic message;
   comparing a domain of a sender the uncategorized electronic message to a domain of a sender from at least one previously categorized electronic message;
   comparing a domain of a recipient the uncategorized electronic message to a domain of a recipient from at least one previously categorized electronic message.

9. The computer-implemented method of claim 1, further comprising:

collecting relevance levels assigned to the previously categorized electronic messages;

comparing the relevance level of the uncategorized electronic message to the relevance levels assigned to the previously categorized electronic messages;

ranking, based at least in part on the relevance levels, a set of electronic messages that includes the uncategorized electronic message and the previously categorized electronic messages;

providing the ranked set of electronic messages to the compliance reviewer as part of the compliance review.

10. The computer-implemented method of claim 1, further comprising at least one of:

deleting the information gathered from the previously categorized electronic messages upon completion of the compliance review and initiation of a new compliance review for the organization;

deleting the information gathered from the previously categorized electronic messages due at least in part to the information being out of date.

11. The computer-implemented method of claim 1, wherein:

determining the relevance level of the uncategorized electronic message comprises determining that the uncategorized electronic message is substantially relevant to the compliance review;

receiving the feedback indicating whether the determined relevance level is correct comprises receiving feedback indicating that the relevance level is incorrect and the uncategorized electronic message is substantially irrelevant to the compliance review;

updating the previously gathered information based on the feedback comprises updating the previously gathered information to indicate that the uncategorized electronic message is substantially irrelevant to the compliance review.

12. The computer-implemented method of claim 1, wherein:

determining the relevance level of the uncategorized electronic message comprises determining that the uncategorized electronic message is substantially irrelevant to the compliance review;

receiving the feedback indicating whether the determined relevance level is correct comprises receiving feedback indicating that the relevance level is incorrect and the uncategorized electronic message is substantially relevant to the compliance review;

updating the previously gathered information based on the feedback comprises updating the previously gathered information to indicate that the uncategorized electronic message is substantially relevant to the compliance review.

13. A system for categorizing electronic messages for compliance reviews, the system comprising:

an identification module, stored in memory, that identifies, as part of a compliance review for an organization, an uncategorized electronic message sent or received by a supervised user within the organization;

a comparison module, stored in memory, that compares the uncategorized electronic message with information gathered from previously categorized electronic messages sent or received by supervised users within the organization;

a determination module, stored in memory, that:

determines, based at least in part on the comparison, a relevance level of the uncategorized electronic message with respect to the compliance review, wherein the relevance level is determined by at least identifying a keyword in the uncategorized electronic message that appears in at least one of the previously categorized electronic messages sent or received by at least a predetermined threshold of the supervised users within the organization, assigning, to the uncategorized electronic message, a first relevance level that is above a relevance threshold due at least in part to examined evidence indicating that the uncategorized electronic message is not a communication comprising at least one of a scheduled report, an event invitation, or an announcement sent or received by supervised users, wherein the first relevance level corresponds to electronic messages that are not included in the communication, and assigning, to the uncategorized electronic message, a second relevance level that is below the relevance threshold due at least in part to examined evidence indicating that the uncategorized electronic message is the communication, wherein the second relevance level corresponds to electronic messages that are included in the communication;

determines whether the uncategorized electronic message was received from a listserv by the supervised user within the organization, wherein upon determining that the uncategorized message was received from the listserv, the uncategorized electronic message is categorized as not relevant with respect to the compliance review irrespective of the relevance level determined by the identified keyword; and presents, in an interface, a list of electronic messages ranked according to the determined relevance level, wherein the list includes visual highlighting applied to the electronic messages corresponding to the determined relevance level, thereby decreasing a likelihood of a reviewer missing a relevant electronic message;

a receiving module, stored in memory, that receives, from a compliance reviewer, feedback indicating whether the determined relevance level is correct;

an updating module, stored in memory, that updates the previously gathered information based on the feedback from the compliance reviewer;

at least one physical processor configured to execute the identification module, the comparison module, the determination module, the receiving module, and the updating module.

14. The system of claim 13, wherein the compliance review comprises an examination, by the compliance reviewer, of at least a subset of all electronic messages sent or received by the supervised users within the organization, wherein in order to determine whether the subset of electronic messages sent or received by the supervised users includes any evidence of at least one activity by the supervised users.

15. The system of claim 13, wherein the determination module further determines the relevance level of the uncategorized electronic message by:

examining the uncategorized electronic message for any evidence indicating whether the uncategorized electronic message is comprising the at least one of a scheduled report, an event invitation, or an announcement sent or received by the supervised users;

determining, based at least in part on the examination of the uncategorized electronic message, the relevance level of the uncategorized electronic message.

16. The system of claim 13, wherein the comparison module compares the uncategorized electronic message with the information gathered from the previously categorized electronic messages by comparing a recipient of the uncategorized electronic message to a recipient of at least one previously categorized electronic message.

17. The system of claim 13, wherein the comparison module compares the uncategorized electronic message with the information gathered from the previously categorized electronic messages by comparing a sender of the uncategorized electronic message to a sender of at least one previously categorized electronic message.

18. A non-transitory computer-readable medium comprising one or more computer-readable instructions that, when executed by at least one processor of a computing device comprising a memory, cause the computing device to:
  identify, as part of a compliance review for an organization, an uncategorized electronic message sent or received by a supervised user within the organization;
  compare the uncategorized electronic message with information gathered from previously categorized electronic messages sent or received by supervised users within the organization;
  determine, by a determining module stored in the memory, based at least in part on the comparison, a relevance level of the uncategorized electronic message with respect to the compliance review, wherein the relevance level is determined by at least identifying a keyword in the uncategorized electronic message that appears in at least one of the previously categorized electronic messages sent or received by at least a predetermined threshold of the supervised users within the organization, assigning, to the uncategorized electronic message, a first relevance level that is above a relevance threshold due at least in part to examined evidence indicating that the uncategorized electronic message is not a communication comprising at least one of a scheduled report, an event invitation, or an announcement sent or received by supervised users, wherein the first relevance level corresponds to electronic messages that are not included in the communication, and assigning, to the uncategorized electronic message, a second relevance level that is below the relevance threshold due at least in part to examined evidence indicating that the uncategorized electronic message is the communication, wherein the second relevance level corresponds to electronic messages that are included in the communication;
  determine, by the determining module stored in the memory, whether the uncategorized electronic message was received from a listserv by the supervised user within the organization, wherein upon determining that the uncategorized message was received from the listserv, the uncategorized electronic message is categorized as not relevant with respect to the compliance review irrespective of the relevance level determined by the identified keyword;
  receive, from a compliance reviewer, feedback indicating whether the determined relevance level is correct;
  update the previously gathered information based on the feedback from the compliance reviewer;
  present, in an interface, a list of electronic messages ranked according to the determined relevance level, wherein the list includes visual highlighting applied to the electronic messages corresponding to the determined relevance level, thereby decreasing a likelihood of a reviewer missing a relevant electronic message.

* * * * *